United States Patent [19]

Ben-Haim

[11] 4,180,187

[45] Dec. 25, 1979

[54] AUTOMATIC PISTON DRIVE MECHANISM FOR USE IN CAULKING GUN

[76] Inventor: Haim Ben-Haim, 4800 Cote St. Catherine Rd., Apt. 17, Montreal, Quebec, Canada

[21] Appl. No.: 921,046

[22] Filed: Jun. 30, 1978

[51] Int. Cl.² ............................................. B67D 5/46
[52] U.S. Cl. ................................... 222/326; 222/333; 222/390; 74/424.8 A; 192/141
[58] Field of Search ............... 222/326, 327, 333, 390; 74/424.8 A; 192/141

[56] References Cited

U.S. PATENT DOCUMENTS 3,861,567   1/1975   Davis ................................... 222/333

Primary Examiner—Allen N. Knowles

[57] ABSTRACT

An automatic piston drive mechanism for use in dispensing flowable compound material through an orifice of a housing in which the material is contained. The housing may be that of a caulking gun or else that of a cartridge as insertable on a carriage of a caulking gun support frame. The drive mechanism comprises a piston member having an elongated rod and a pusher head. A drive motor is provided for imparting longitudinal displacement of the rod. A clutch member is rotatably driven by the drive motor and releasably connected to the rod to impart axial rotation thereto to effect axial displacement whereby the pusher head will apply pressure to the compound to push it through the dispensing orifice.

9 Claims, 5 Drawing Figures

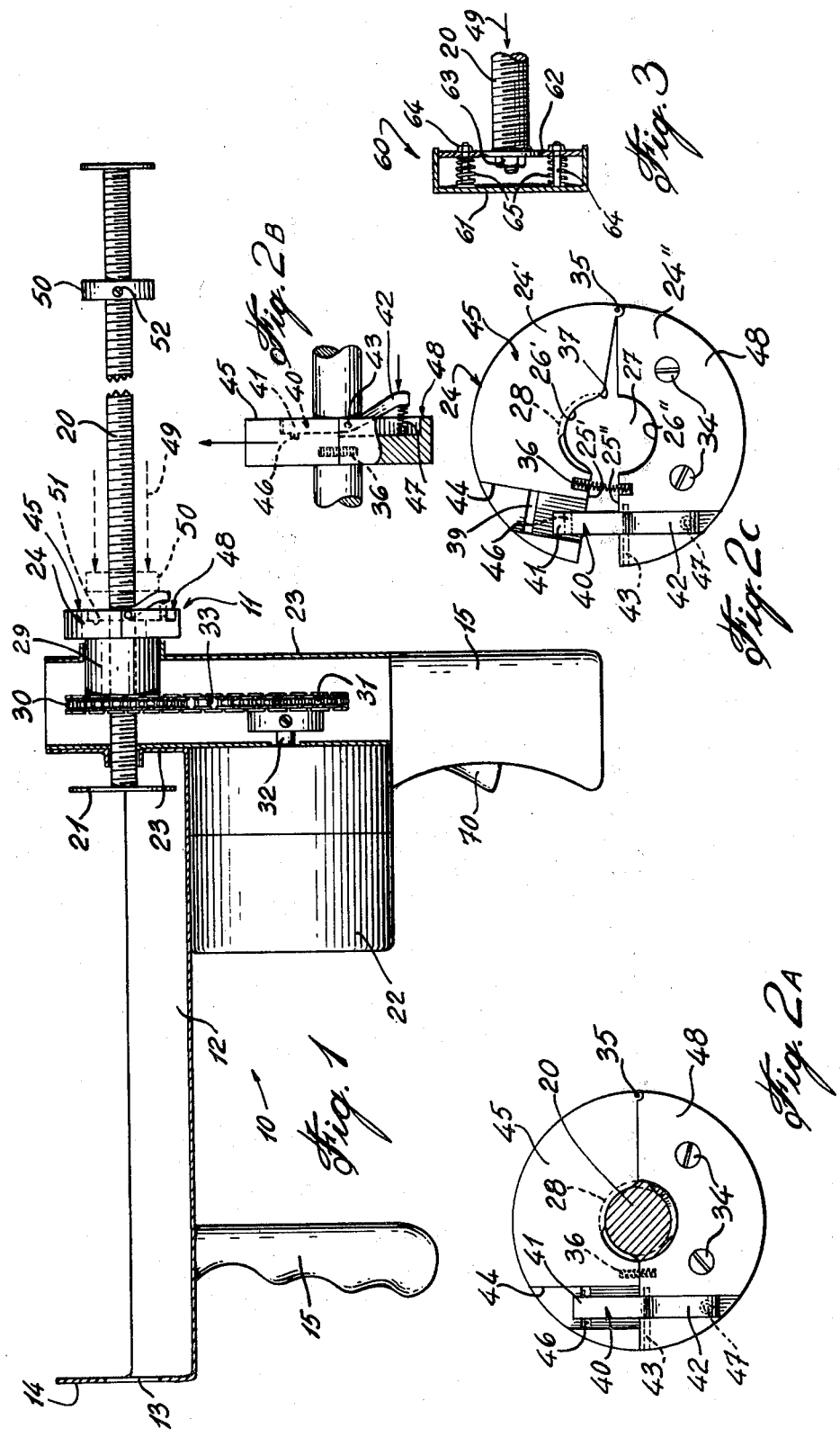

AUTOMATIC PISTON DRIVE MECHANISM FOR USE IN CAULKING GUN

BACKGROUND OF INVENTION (a) Field of the Invention

The present invention relates to an automatic piston drive mechanism for use in dispensing flowable compound material through a dispensing orifice of a chamber housing the material.

(b) Description of Prior Art

Various caulking gun structures are known. Most commonly known is the caulking gun structure wherein cartridges having a housing with compound therein and a displaceable rear wall is inserted on a caulking gun support frame. A piston having a pusher head is engaged by a mechanical lever having a handle which is displaced by a hand movement of the user whereby to advance the piston rod to cause the pusher to displace the rear wall of the cartridge to cause the compound therein to be dispensed through a spout in the front wall of the cartridge.

Some disadvantages of this type of caulking gun are that it is difficult to apply a constant pressure on the rear wall of the cartridge whereby to dispense a constant flow of compound through the spout as the pressure on the rod is activated by a hand lever and the force cannot be maintained gradual and constant. Further, when it is necessary to stop dispensing compound and longitudinal displacement of the piston rod is stopped, compound will continue to be dispensed in view of pressure build-up in the cartridge. Still further, there is no provision to indicate the amount of compound left within the cartridge during dispensation thereof. Still further, such caulking gun structures can accommodate standard size cartridges only.

SUMMARY OF INVENTION

It is a feature of the present invention to provide an automatic piston drive mechanism adaptable to various types of caulking gun structures and wherein the piston drive is automatic.

A further feature of the present invention is to provide an automatic piston drive mechanism which is automatically driven and wherein a visual indication of the compound material contained in the housing during dispensation thereof is provided.

A further feature of the present invention is to provide an automatic piston drive mechanism which will automatically disengage at a predetermined, preset position.

A further feature of the present invention is to provide an automatic piston drive mechanism wherein the pressure of the pusher head is quickly released when the clutch member imparting longitudinal displacement of the rod, is disengaged.

A still further feature of the present invention is to provide an improved automatic piston drive mechanism which substantially overcomes the disadvantages of the prior art and which is easy to operate.

According to the above features, from a broad aspect, the present invention provides an automatic piston drive mechanism for use in dispensing flowable compound material through an orifice of the housing in which the material is contained. The housing may be that of a caulking gun or else that of a cartridge as insertable on a carriage of a caulking gun support frame. The drive mechanism comprises a piston member having an elongated rod and a pusher head. A drive motor is provided for imparting rotation to a clutch member drivingly connected thereto. The clutch is also releasably and threadably connected to the rod to impart axial displacement of the rod when rotated whereby the pusher head will advance to apply pressure to the compound to push it through the dispensing orifice.

The clutch member has two hinged sections having displaceable abutting faces. A semi-circular channel is provided in each of the faces and extending transversely thereacross and aligned with one another to constitute a circular bore when the abutting faces are juxtaposed. One of the channels has a thread engaging means in an inner face for threaded engagement with the rod.

BRIEF DESCRIPTION OF DRAWINGS

A preferred embodiment of the present invention will now be described with reference to the example of such embodiment illustrated by the accompanying drawings, in which:

FIG. 1 is a side view, partly sectioned, of a caulking gun having the automatic piston drive mechanism of the present invention;

FIG. 2A is a rear view of the clutch member;

FIG. 2B is a side view of FIG. 2A;

FIG. 2C is a rear view showing the clutch member disengaged; and

FIG. 3 is a side view, partly sectioned, of an example of a pusher head modification.

DESCRIPTION OF PREFERRED EMBODIMENTS

Referring now to the drawings and more particularly to FIG. 1, there is shown generally at 10 the construction of a caulking gun embodying the drive mechanism 11 of the present invention. The caulking gun comprises a housing defining a cartridge support 12 to accommodate a cartridge (not shown) therein (of the type well known in the art) and having a displaceable rear wall and a dispensing spout in the front wall thereof. The spout extends through a hole 13 in the front wall 14 of the support. Handle means such as at 15 are provided to support the gun by the user.

The drive mechanism 11 comprises a piston member constituted by an elongated threaded rod 20 and a pusher head 21. A drive motor 22 is secured to a housing wall 23 and is connected to a clutch member 24 to rotatably drive the clutch member which is in threaded engagement with the rod 20 whereby the rod 20 can be displaced longitudinally (axially) so that the pusher head 21 advances and applies pressure to a rear wall of the cartridge (not shown) having the compound therein whereby to dispense the compound through the dispensing spout of the cartridge.

Referring now additionally to FIGS. 2A to 2C there is shown the construction of the clutch member 24. The clutch member is herein shown constructed as a disc, herein a circular disc constituted by two hinged semi-circular sections 24' and 24". Each disc section has a displaceable abutting face 25' and 25" respectively, having a channel 26' and 26" respectively and of semi-circular cross-section centrally disposed therein whereby when said faces are juxtaposed, as shown in FIG. 2A, the channels are aligned and constitute a circular central bore 27. One of the channels, herein channel 26', has a thread engagement means constituted by a threaded inner face for threaded engagement with the threaded rod 20.

The other semi-circular section 24" is secured to an extension body portion 29 of a sprocket gear 30 which is rotatably driven by the drive sprocket 31 secured to the drive shaft 32 of the motor 22 via a drive chain 33 secured between the gear 30 and the sprocket 31. As hereinshown the section 24" is secured by means of bolts 34. Thus, rotational drive is imparted to the section 24" of the clutch member 24 when the motor 22 operates.

As shown more specifically in FIG. 2C, a hinge 35 connects the semi-circular sections 24' and 24" together along a peripheral edge transverse to the plane of the sections along the faces 25' and 25". A spring 36 urges the abutting faces 25' and 25" of the sections apart on the hinge 35 whereby the rod 20 is no longer engaged with the clutch member 24 when the section 24' is spaced therefrom. The outer edge of the semi-circular channel 26', closest to the hinge 35, has an inner tapered face 37 to facilitate threaded disengagement with the threaded rod 20. The tapered face 37 permits disengagement without having to move the section 24' through a large angle.

The clutch member 24 is further provided with an automatic disengage means which is constituted by a locking lever 40 having a lock arm 41 and a disengaging arm 42. The lever 40 is secured to one of the sections 24' or 24", herein section 24" by means of a pivot 43. The lock arm bridges the abutting faces 25' and 25" of the sections and is displaceable on the pivot 43 out of a channel 44 provided in an outer face 45 of the section 24'. The channel 44 is of sufficient width to prevent interference with the lock arm 41 and permit arcuate hinge displacement of the section 24', as clearly shown in FIG. 2C. A locking groove 39 extends across the channel 44 and is engaged by a tongue 46 provided on the inner face of a lock arm 41. The locking lever 40 is biased within the channel 44 by spring means, herein a coil spring 47 engaging the disengaging arm 42 and located in the section 24". Thus, the locking lever is biased in a locked position while the disengaging arm 42 is biased outwardly of the outer face 48 of the section 24".

A clutch release member 50 is in threaded engagement with the rod 20 and displaceable therealong and immovably securable at a predetermined position along the length of the rod 20. The clutch release member 50 will abut and push against the disengaging arm 42 of the clutch member 24 when the rod 20 has been displaced forwardly in the direction of arrow 49 whereby to cause the locking lever 40 to pivot on its pivot 43 to withdraw the locking lever from engagement with the section 24', as illustrated in phantom lines 51 in FIG. 1. The clutch release member is immovably securable to the rod by suitable fastening means such as the screw 52 extending transversely within the member 50. The position of the clutch release member 50 is dependent on the length of a cartridge positioned in the cartridge support 12 whereby the pusher head 21 is advanced to a position where most of the compound has been pushed out of the cartridge.

In order to quickly release the pressure on the pusher head 21 after most of the compound has been pushed out of the cartridge and when the clutch member is disengaged upon activation of the lever, the pusher head may be constructed as shown in FIG. 3. Herein, the pusher head 21 and rod 20 are spring biased rearwardly by means of a pusher head structure 60. The pusher head structure 60 comprises an outer pusher wall 61 and an inner pusher wall 62. The inner pusher wall 62 is secured to an end of the elongated rod 20 by suitable fastening means such as the bolts 63. Guide rods 64 are secured in an inner face of the outer pusher wall 61 and freely extend through holes (not shown) in the inner wall 62. Spring means herein a coil spring 65 is positioned about each guide rod 64, between the inner faces of both the outer and inner pusher walls, and urges the inner pusher wall away from the outer pusher wall when there is no pressure applied by the rod 20 in the direction of arrow 49. Thus, as soon as the clutch member 24 is disengaged there is no restraining force on the rod 20 and the spring 65 will push the inner wall 62 away from the outer wall 61. Also, any pressure built up in the cartridge will exert a release pressure on the wall 61, as there is less resistance there than through the spout, whereby to release pressure build-up and stop the flow of the compound through the spout of the cartridge (not shown).

In the embodiment of the caulking gun structure as shown in FIG. 1, the motor 22 is conveniently located in a handle structure and is operated by a trigger switch 70. Also, the drive connections between the motor and the clutch member 24 are housed within the housing wall 23 with the clutch member 24 located on the outside of the housing wall 23 whereby the locking lever 40 is accessible to the clutch release member 50. Other convenient housing arrangement may be provided. Also, the drive mechanism as hereinshown may be adapted to existing caulking guns having housings wherein compound can be inserted in the housing with the pusher head 21 being trapped within the said housing. Further, the gearing for the drive may be arranged differently to provide a reverse drive to displace the rod 20 in a reverse direction. Also, the support 12 may be interchangeable to adapt to support various length cartridges.

It is within the ambit of the present invention to provide any obvious modifications of the embodiment disclosed herein, provided such modifications fall within the scope of the claims appended hereto.

I claim:

1. An automatic piston drive mechanism for use in dispensing flowable compound material through a dispensing orifice of a housing in which said material is contained, said mechanism comprising:
   a piston member having an elongated rod and a pusher head;
   a drive motor;
   a clutch member releasably and threadably connected to said rod, said clutch member having two hinged sections having displaceable abutting faces, a semi-circular channel in each of said faces extending transversely there-across and aligned with one another to constitute a circular bore when said abutting faces are juxtaposed, one of said channels having a thread engaging means in an inner face for threaded engagement with said rod;
   said clutch member having a drive connection to said motor and rotatably driven by said motor to impart fixed rotation thereto to effect axial displacement of said rod by its connection whereby said pusher head will advance and apply pressure to said compound to push it through said dispensing orifice.

2. A drive mechanism as claimed in claim 1 wherein said clutch member comprises automatic disengage means to disengage said clutch member from said rod upon a predetermined longitudinal displacement of said rod.

3. A drive mechanism as claimed in claim 2 wherein said automatic disengage means comprises a locking lever for securing said two hinged sections with said abutting faces juxtaposed, said lever having a lock arm and a disengaging arm, a clutch release member displaceably engageable with said rod to engage said disengaging arm upon abutting therewith upon a predetermined axial displacement of said rod.

4. A drive mechanism as claimed in claim 3 wherein said two hinged sections are semi-circular sections, a hinge connecting said sections along a peripheral edge transverse to the plane of said sections, said lever being secured to one of said sections on a pivot, said lock arm extending across said abutting faces and displaceable on said pivot from a common outer face of said sections, said disengaging arm being spring biased outwardly of said common outer face with said lock arm biased in a locking position, and spring means urging said abutting faces to hinge apart when said lock arm is disengaged.

5. A drive mechanism as claimed in claim 4 wherein a sprocket gear is secured to one of said semi-circular sections, a drive sprocket secured to a drive shaft of said motor, a chain engaged between said sprocket gear and drive sprocket to impart rotational displacement of said clutch member about said rod to cause said longitudinal displacement of said rod.

6. A drive mechanism as claimed in claim 4 wherein said lock arm extends in a channel in said common outer face of one of said sections, said channel being of sufficient width to permit arcuate hinge displacement between said sections without interference with said lock arm; an outer edge of said semi-circular channel, on said section having said thread and being closest to said hinge, having an inner tapered face to facilitate threaded disengagement with said threaded rod.

7. A drive mechanism as claimed in claim 5 wherein said drive mechanism is secured to a support frame, a carriage secured to said support frame to removably support cartridges having said compound material in a housing thereof, said cartridge having a displaceable rear wall and a dispensing spout in a front wall thereof, said pusher head being in facial engagement with said displaceable rear wall.

8. A drive mechanism as claimed in claim 1 wherein said pusher head comprises an outer pusher wall and an inner pusher wall, guide rods securing said outer and inner pusher walls in parallel displacing relationship, spring means between said pusher walls urging them apart, said rod having an end secured to the said inner pusher wall.

9. A drive mechanism as claimed in claim 5 wherein said pusher head is located inside a housing of a caulking gun, trigger switch means to operate said motor to cause said rod to be displaced forwardly within said housing.

* * * * *